US006532486B1

(12) United States Patent
Tessarolo

(10) Patent No.: US 6,532,486 B1
(45) Date of Patent: Mar. 11, 2003

(54) APPARATUS AND METHOD FOR SATURATING DATA IN REGISTER

(75) Inventor: Alexander Tessarolo, Sydney (AT)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/464,731

(22) Filed: Dec. 15, 1999

Related U.S. Application Data

(60) Provisional application No. 60/112,622, filed on Dec. 16, 1998.

(51) Int. Cl.[7] .................................................. G06F 7/38
(52) U.S. Cl. ...................................................... 708/552
(58) Field of Search ................................... 708/552, 498

(56) References Cited

U.S. PATENT DOCUMENTS

| | | | | |
|---|---|---|---|---|
| 5,915,109 A | * | 6/1999 | Nakakimura et al. | 708/552 |
| 5,917,740 A | * | 6/1999 | Volkonsky | 708/552 |
| 5,936,870 A | * | 8/1999 | Im | 708/552 |
| 6,209,017 B1 | * | 3/2001 | Lim et al. | 708/551 |
| 6,237,084 B1 | * | 5/2001 | Morikawa et al. | 708/551 |

* cited by examiner

Primary Examiner—David H. Malzahn
(74) Attorney, Agent, or Firm—Bret J. Petersen; W. James Brady; Frederick J. Telecky, Jr.

(57) ABSTRACT

A method for saturating data in a register (100) is disclosed. The method comprises shifting data contents in the register (100) by a saturation value and setting at least one bit equal to a sign bit (110) on the register (100). The method further comprises storing the shifted contents in a temporary register (160), which (160) has compare bits (180). The method further comprises setting high bits (150) and low bits (140) to a positive value when the compare bits (180) are not equal to the sign bit (110) and the sign bit indicates a positive data word in the register (100). The method further comprises setting the high bits (150) and low bits (140) to a negative value when the compare bits (180) are not equal to the sign bit (110), and the sign bit (110) indicates a negative data word in the register (100). The method further comprises shifting the set data contents in the register (100) by the saturation value and setting at least one bit equal to a least significant bit (102) on the register (100). Further, an apparatus for saturating data in a register (100) is disclosed. The apparatus comprises the register (100) having a sign bit (110), a least significant bit (102), high bits (150) and low bits (140). The apparatus further comprises a shifting device for shifting the data contents in the register (100) by a saturation value. The apparatus further comprises a temporary register (160), having compare bits (180), that stores the shifted contents of the register (100). The apparatus further comprises a device for setting the high bits (150) and the low bits (140) to a positive value when the compare bits (180) are not equal to the sign bit (110), and the sign bit (110) indicates a positive data word in the register (100). The device also sets the high bits (150) and the low bits (140) to a negative value when the compare bits (180) are not equal to the sign bit (110), and the sign bit (110) indicates a negative data word in the register (100).

21 Claims, 4 Drawing Sheets

APPARATUS AND METHOD FOR SATURATING DATA IN REGISTER

This application claims the benefit of Provisional application Ser. No. 60/112,622, filed Dec. 16, 1998.

TECHNICAL FIELD OF THE INVENTION

The present invention relates in general to processors and, more particularly, to an apparatus and method for saturating data in a register on a processor.

BACKGROUND OF THE INVENTION

Digital signal processors (DSPs) are widely used in many devices that typically interface with some type of control device. Frequently, the word length of the data provided to the DSP by the control device is shorter than the word length of the DSP registers. In many control algorithms, such as state estimators, PID, and kalman filters, intermediate and final results may need to be saturated. Saturation sets the register, such as an accumulator, to a maximum or minimum value. The saturation value of the control algorithm in the register must be compatible with the control device, i.e., the saturation value must be the same length as the control device word length. Processors and corresponding devices may have instructions for saturation operations. Generally, these operations only saturate when the full value of the register is exceeded. For example, a 32-bit register will be saturated when a value exceeds the limits of the 32-bit register range.

In some devices instructions are provided that will saturate the register at any bit position. These instructions may include multiple steps and cycles. For example, the following instructions may be executed to saturate a 16-bit value in a 32-bit register. First, saturation mode is enabled on the processor. Second, a saturation value, which is stored in a memory location, is added to bits 16–31 of the register. Third, the saturation value is subtracted from these bits of the register. Fourth, the saturation value is again subtracted from these bits of the register. Finally, the saturation value is added to these bits of the register. This method requires five instructions and five cycles to implement. A 32-bit value may require up to nine instructions and nine cycles to implement. The above method also requires data memory read and write operations and, thus, increased power consumption. Further, it also requires memory locations to store the saturation values for each particular saturation range. Thus, these techniques for saturating at any bit position require additional silicon or additional software instructions to implement.

SUMMARY OF THE INVENTION

From the foregoing, it may be appreciated that a need has arisen for a method for saturating contents in a register at any bit position with a reduced number of instructions, and without the need for memory space. In accordance with the present invention, an apparatus and method for saturating contents in a register is provided that substantially eliminates and reduces the disadvantages and problems associated with conventional register operations.

A method for saturating data in a register on a processor in accordance with the present invention comprises five steps. The first step comprises shifting the data contents in the register by a saturation value and setting at least one bit equal to a sign bit on the register. The second step comprises storing the shifted contents in a temporary register, wherein the temporary register has compare bits. The third step comprises setting high bits and low bits of the register to a positive value when the compare bits of the temporary register are not equal to the sign bit, and the sign bit indicates a positive data word in the register. The fourth step comprises setting the high bits and the low bits of the register to a negative value when the compare bits of the temporary register are not equal to the sign bit, and the sign bit indicates a negative data word in the register. The fifth step comprises shifting the set data contents in the register by the saturation value and setting at least one bit equal to a least significant bit on the register.

In another embodiment, a method for saturating data in a register on a processor in accordance with the present invention comprises five steps. The first step comprises right shifting the data contents in the register by a saturation value, and setting at least one bit equal to a sign bit, wherein the sign bit is on the register. The second step comprises storing the shifted data contents in a temporary register. The third step comprises comparing the sign bit to the shifted contents in the temporary register. The fourth step comprises setting the bits in the register equal to 1 when the shifted contents in the temporary register are not equal to the sign bit, and when the sign bit is equal to 0, and then left shifting the set data contents in the register by the saturation value, and setting at least one bit equal to 1. The fifth step comprises setting the bits in the register equal to 0 when the shifted contents in the temporary register are not equal to the sign bit, and when the sign bit is equal to 1, and then left shifting the set data contents in the register by the saturation value, and setting at least one bit equal to 0.

In another embodiment, an apparatus for saturating data in a register on a processor in accordance with the present invention is disclosed. The register has a sign bit, a least significant bit, high bits and low bits. The apparatus also has a shifting device, wherein the data contents in the register are shifted by a saturation value. The apparatus also has a temporary register having compare bits, wherein the shifted contents of the register are stored. The apparatus also has a device for setting high bits and low bits of the register to a positive value when the compare bits of the temporary register are not equal to the sign bit, and the sign bit indicates a positive data word in the register. The device also sets the high bits and the low bits of the register to a negative value when the compare bits of the temporary register are not equal to the sign bit, and the sign bit indicates a negative data word in the register.

A technical advantage of the present invention is that a method for saturating data in a register on a processor is provided. Another technical advantage is that overflow problems are resolved on the register. Another technical advantage is that compatibility with devices requiring a variety of data sizes may be achieved. Another technical advantage is that saturation operations may be performed in a reduced number of cycles. Another technical advantage is that saturation operations may be executed without requiring additional memory or software. Another technical advantage is that the register may be saturated at any user specified bit position with a reduced number of instructions and cycles. Another technical advantage is that any register size may be saturated in accordance with the present invention. Another technical advantage is that data memory read and write operations are avoided. Another technical advantage is that power consumption requirements are reduced.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

An embodiment of the present invention and its advantages are best understood by referring now in more detail to FIGS. 1, 1a, 2, 3, 4, 5, 6 and 7 of the drawings, in which like numerals refer to like parts. FIGS. 1, 2, 3, 4, 5, 6, and 7 illustrate an apparatus and method for saturating a register on a processor in accordance with one embodiment of the present invention.

Figure 1:
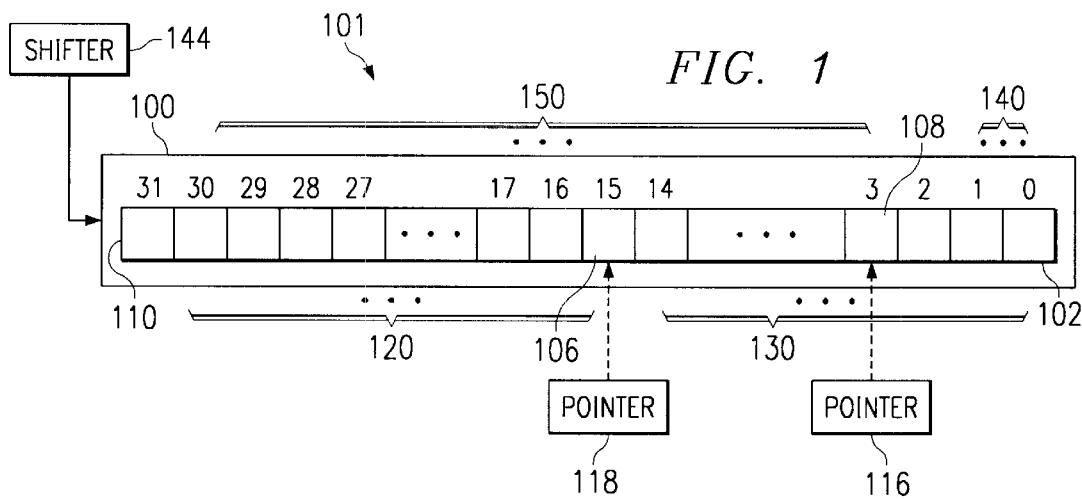
FIG. 1, shows a 32-bit register for use in accordance with one embodiment of the present invention.

FIG. 1 illustrates a register 100 on processor 101 for use with the present invention. Register 100 stores data for use in operations on processor 101. The size of register 100 determines the size of the data words to be stored. Specifically, register 100 may be a 32-bit register capable of storing 32 bits of data. In the alternative, register 100 may be a 16-bit register capable of storing 16 bits of data. Processor 101 may execute instructions and operations that read, modify, or write data in register 100.

In an embodiment, register 100 is a 32-bit register. The data stored in register 100 may be a result of a control algorithm executed on processor 101. The data contents of register 100 may be data words. The data words in register 100 may be any size up to the size of register 100. If register 100 is a 32-bit register, than the maximum data word size is 32 bits, or, in hexadecimal, FFFF FFFF.

Least significant bit 102 indicates the least significant bit of register 100. Referring to FIG. 1, least significant bit 102 is bit 0. Sign bit 110 indicates the most significant bit of register 100. Referring to FIG. 1, bit 31 of register 100 is sign bit 110. Sign bit 110 indicates whether the data stored in register 100 represents a positive or negative number. A 0 value in sign bit 110 may indicate the data stored in register 100 is positive. If sign bit 110 has a value of 1, then the data contents stored in register 100 may be negative. In an embodiment, sign bit 110 indicates 2s complement notation of register 100. In the alternative, if register 100 is a 16-bit register, sign bit 110 is bit 15.

Pointers 116 and 118 point to bit locations on register 100. Pointers 116 and 118 may be on processor 101. In an embodiment, pointer 118 indicates a range bit 106 and pointer 116 indicates a base bit 108. The location of base bit 108 determines high bits 150 and low bits 140 on register 100 for use in accordance with an embodiment of the present invention. The location of range bit 106 determines overflow bits 120 and range 130 on register 100 for use in accordance with an embodiment of the present invention. Overflow bits 120 may be the set of bits that include range bit 106 and those bits greater than range bit 106. Range 130 may be the set of bits less than range bit 106.

Range bit 106 determines the maximum and minimum range of data values desired on register 100. Range bit 106 may be any bit in register 100. Referring to FIG. 1, range bit 106 is bit 15. Base bit 108 indicates the base location in register 100. Base bit 108 also may be any bit location register 100, however, in an embodiment, base bit 108 is not greater than range bit 106. Base bit 108 is the minimum value of range 130 that may be saturated on register 100. Base bit 108 provides a common reference for operations executed on register 100. This minimum value may be a design preference dependent on hardware implementing register 100. Referring to FIG. 1, base bit 108 is bit 3. In the alternative, base bit 108 may be least significant bit 102.

In an embodiment, register 100 is saturated when the data value exceeds range 130, as indicated by range bit 106. The bits of range 130, below range bit 106, may be 0 or 1 during operations on register 100. Overflow bits 120, however, are equal to the value of sign bit 110 during operations on register 100. If an overflow occurs in register 100, overflow bits 120 do not equal the value of sign bit 110. An overflow occurs when the data value in register 110 is greater than or less than the maximum positive or negative number allowed by range 130, and indicated by range bit 106. In an embodiment, register 100 is instructed by processor 101 to set range bit 106 to the maximum data size desired. As the contents in register 100 are modified during the operations, saturation may occur, which results in incorrect data being read from register 100 due to operations, such as carry or shift. Consequently, improper results may be read by processor 101 from register 100 after an overflow.

Register 100 then may be saturated to modify the contents to be compatible with processor 101. In an embodiment, a positive maximum saturation value may have all bits of range 130 equal to 1 and all overflow bits 120 equal to 0. Thus, saturation allows the maximum positive value for the range indicated by range bit 106 to be read from register 100 if overflow occurs during operations on processor 101. The maximum negative number may have bits of range 130 equal to 0 and overflow bits 120 equal to 1. This value may be in 2s complement form. Thus, saturation allows the maximum negative value to be read from register 100 when operations have exceeded the maximum negative number allowed by the range 130.

Figure 1A:
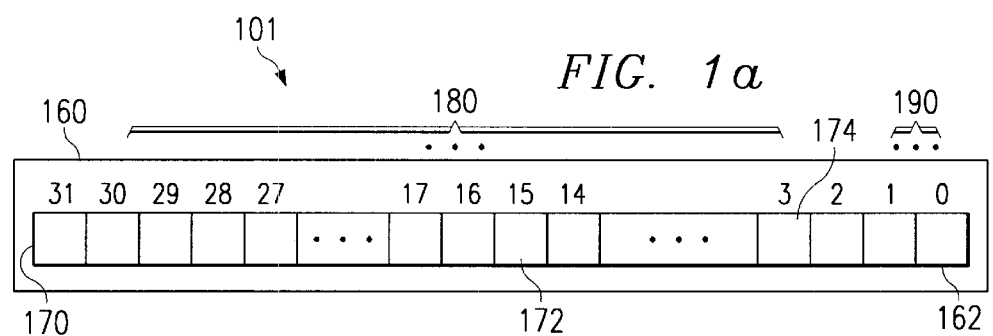
FIG. 1a, shows a temporary register for use in accordance with one embodiment of the present invention.

FIG. 1a illustrates a temporary register 160 for use in accordance with an embodiment of the present invention. Temporary register 160 may store the data contents of register 100 during operations on processor 101, and is equivalent in bit size to register 100. Temporary register 160 has a least significant bit 162 and a most significant bit 170. In an embodiment, temporary register 160 is a 32-bit register, and least significant bit 162 is bit 0 and most significant bit 170 is bit 31. Temporary register 160 also has a base bit 174, which is in the same bit location of base bit 108 of register 100. Thus, a common base location may be had between register 100 and temporary register 160. Temporary register 160 also may have a range bit 172. Temporary register 160 has compare bits 180 which may be a set of bits greater than and including base bit 174. Low bits 190 of temporary register 160 of the set of bits less than base bit 174.

Figure 2:
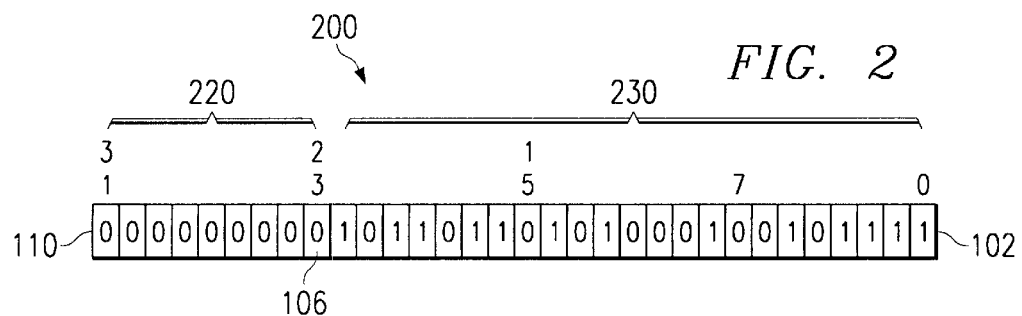
FIG. 2, shows a 32-bit register storing a positive number in accordance with one embodiment of the present invention.

FIG. 2 illustrates a register 200 storing a positive number in accordance with one embodiment of the present invention. Least significant bit 102 is bit 0 and sign bit 110 is bit 31. Range bit 106 is bit 23. Thus, the data range desired by operations performed by processor 101 is 22 bits. Overflow bits 220 of register 200 indicate the set of bits greater than, and including, range bit 106. Range 230 is the set of bits less than range bit 106. Referring to FIG. 2, range 230 is bits 0 to 22, and overflow bits 220 are bits 23 to 30. Sign bit 110 has a value of 0, which indicates that a positive number is stored in register 200. No overflow has occurred during operations on register 200 because overflow bits 220 are equal to sign bit 110.

Figure 3:
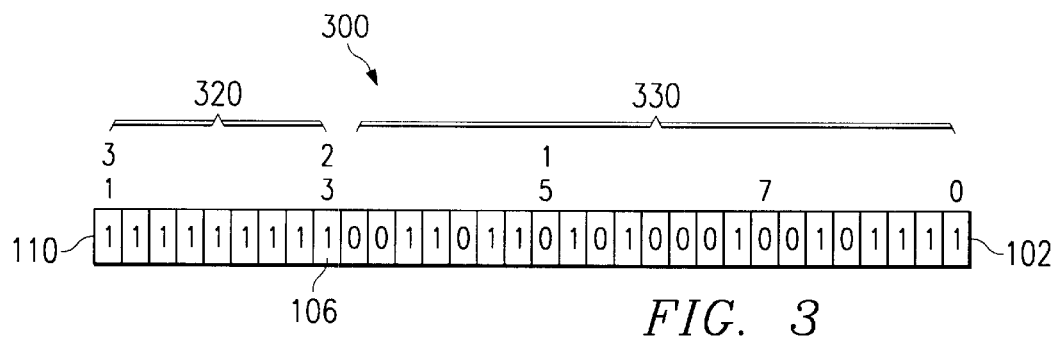
FIG. 3, shows a 32-bit register storing a negative number in accordance with one embodiment of the present invention.

FIG. 3 illustrates a register 300 storing a negative number in accordance one embodiment of with the present invention. Least significant bit 102 is bit 0, and sign bit 110 is bit 31. Range bit 106 is bit 23 on register 300. Overflow bits 320 are bits 23 to 30, and range 330 is bits 0 to 22 on register 300. Sign bit 110 has a value of 1, which indicates a negative number is stored in register 300. Overflow bits 320 also are equal to 1. Thus, no overflow has occurred on register 300 during operations performed by processor 101.

Figure 4:
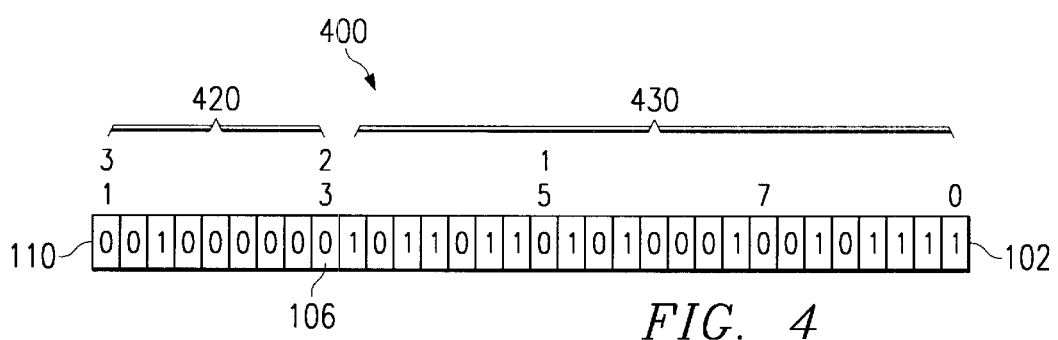
FIG. 4, shows a 32-bit register storing a positive number that exceeds a maximum positive number in accordance with one embodiment of the present invention.

FIG. 4 illustrates a register 400 storing a positive number that exceeds the maximum positive number allowed by the desired range of operations performed by processor 101. Least significant bit 102 is bit 0, and sign bit 110 is bit 31. Range bit 106 is bit 23 on register 400. Overflow bits 420 are bits 23 to 30 on register 400. Range 430 is bits 0 to 22 on register 400. In an embodiment, overflow bits 420 do not equal sign bit 110 when the maximum positive value of the desired range has been exceeded. Further, the bits of range 430 are not all equal to 1, which indicates the maximum positive number. Referring to FIG. 4, bit 29 is not equal to 0. The maximum value of range 430 has been exceeded. Thus, register 400 may be saturated to the maximum positive allowed by range 430 in accordance with the present invention, so that the appropriate value is read from register 400.

Figure 5:
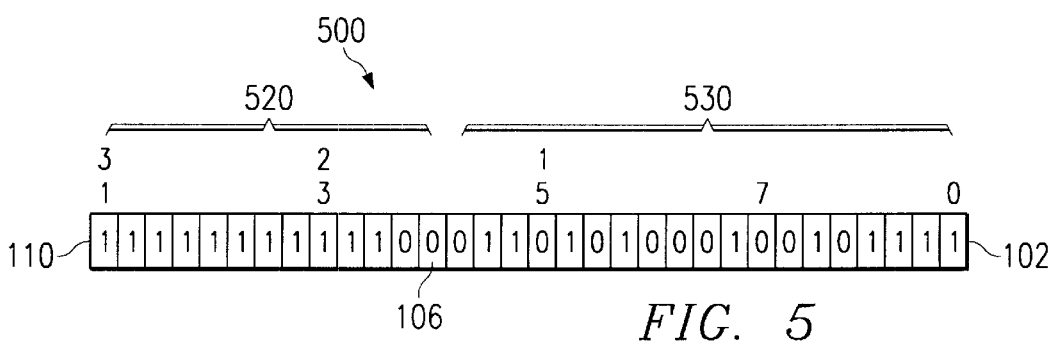
FIG. 5, shows a 32-bit register storing a negative number that exceeds a maximum negative number in accordance with one embodiment of the present invention.

FIG. 5 illustrates a register 500 storing a negative number that exceeds the maximum negative value allowed by the desired range of operations performed by processor 101. Least significant bit 102 is bit 0, and sign bit 110 is bit 31 on register 500. Range bit 106 is bit 19 on register 500. Overflow bits 520 are bits 19 to 30. Range 530 is bits 0 to 18. Register 500 may be in 2s complement notation as a negative number, as indicated by the value of 1 for sign bit 110. Overflow bits 520 do not equal sign 110 when the maximum negative value of the desired range has been exceeded. Referring to FIG. 5, bits 19 and 20 are not equal to sign bit 110. Thus, a negative value has resulted that exceeds the maximum negative value allowed by range 530. In the alternative, any bit greater than range 530 that is not equal to sign bit 110 indicates range 520 has been exceeded. Therefore, register 500 may be saturated to the maximum negative number allowed by range 530, such that the appropriate maximum negative value may be read from register 500.

Figure 6:
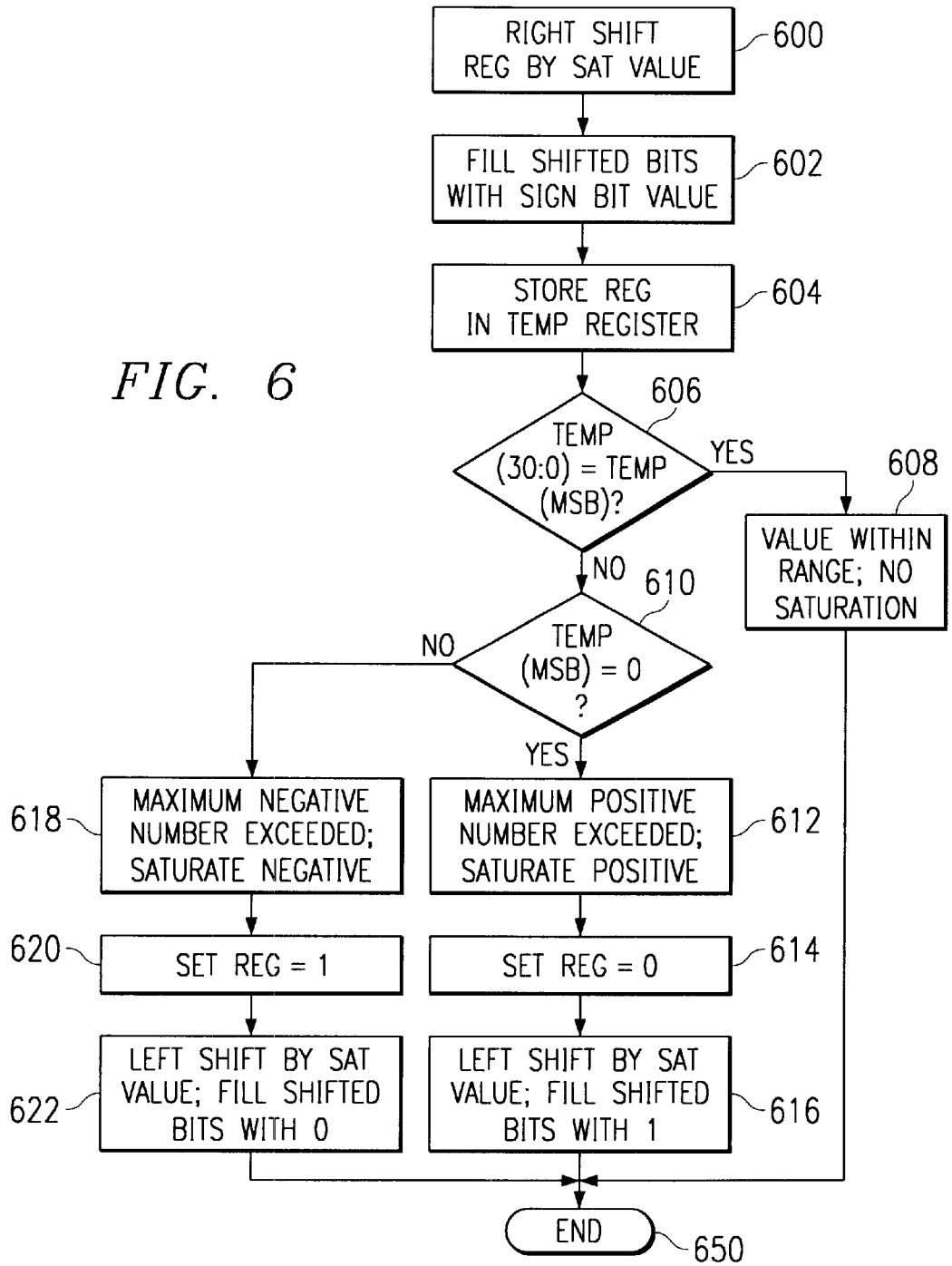
FIG. 6, illustrates a flow chart of a method for saturating contents in a register for use in accordance with one embodiment of the present invention.

Referring to FIG. 6, a method for saturating data contents in register 100 in accordance with the present invention is disclosed. In step 600, the data contents in register 100 are right shifted by a saturation value. Shifting operations on processor 101 may be performed by a barrel shifter. The saturation value may be any number less than the desired range defined by range bit 106 in FIG. 1. In an embodiment, the saturation value may be equal to range 130, as disclosed in FIG. 1. The saturation value determines to which bit position register 100 may be saturated. In step 602, bits that were subject to shifting operations in step 600 are filled with the value in sign bit 110. In an embodiment, register 100 is 32-bit register and sign bit 110 is bit 31, or the most significant bit of register 100. Specifically, if sign bit 110 has a value of 0, then those bits emptied by the shifting operations of step 600 are set to 0. In the alternative, if sign bit 110 has a value of 1, then those bits emptied by the shifting operations are set equal to 1.

In step 604, the shifted contents of register 100 are stored in temporary register 160 on processor 101. In an embodiment, temporary register 160 is a 32-bit register, equal in size to register 100. In step 606, the data contents of temporary register 160 are compared to sign bit 110. Alternatively, the data contents of temporary register 160 may be compared to most significant bit 170, which is the same value as sign bit 110. Step 606 determines whether the bits of temporary register 160 are the same value as sign bit 110. If the bits of temporary register 160 are the same value as sign bit 110, then step 608 is executed. Step 608 indicates the data within register 100 is within the desired range, and no saturation operations are to be performed on register 100. Thus, no overflow occurred on register 100 during operations executed by processor 101.

If the bits of temporary register 160 are not equal to sign bit 110, an overflow occurred on register 100 and register 100 may be saturated to the maximum positive or negative number specified by the desired range. Step 610 determines whether sign bit 110 of temporary register 160 is equal to 0. A value of 0 in sign bit 110 indicates the overflow on register 100 exceeded the maximum positive value allowed by the desired range. If sign bit 110 is not equal to 0, then the maximum negative number has been exceeded on register 100. Step 612 is executed when sign bit 110 is equal to 0. Step 612 indicates that register 100 is to be saturated with a positive number. To saturate to the desired positive number, Step 614 is executed by setting the data contents of register 100 equal to 0. In Step 616, the set contents of register 100 are left shifted by the saturation value from Step 600. The shifted bits emptied by the left shift in register 100 are set to a value of 1. Referring to FIG. 1, after execution of Step 616, range bit 106, sign bit 110, and overflow bits 120 are equal to 0, and the bits of range 130 are equal to 1. Therefore, register 100 has been saturated by setting all bits within the desired range equal to 1.

Step 618 is executed when sign bit 110 of temporary register 160 is not equal to 0 in Step 610. Specifically, sign bit 110 is equal to 1. Step 618 indicates the maximum negative number allowed by the desired range has been exceeded and overflow has occurred on register 100. Further, Step 618 indicates that register 100 is to saturated with the maximum negative number of the desired range. In Step 620, the bits of register 100 are set equal to 1. In Step 622, register 100 is left shifted by the saturation value of Step 600. The shifted bits emptied by the left shift in register 100 are set equal to 0. Referring to FIG. 1, sign bit 110, range bit 106, and overflow bits 120 have a value of 1 and the bits of range 130 have a value of 0. Thus, register 100 has been set to the maximum negative number allowed by the desired range. Step 650 indicates saturation operations have been completed and any overflow conditions on register 100 have been resolved.

Figure 7:
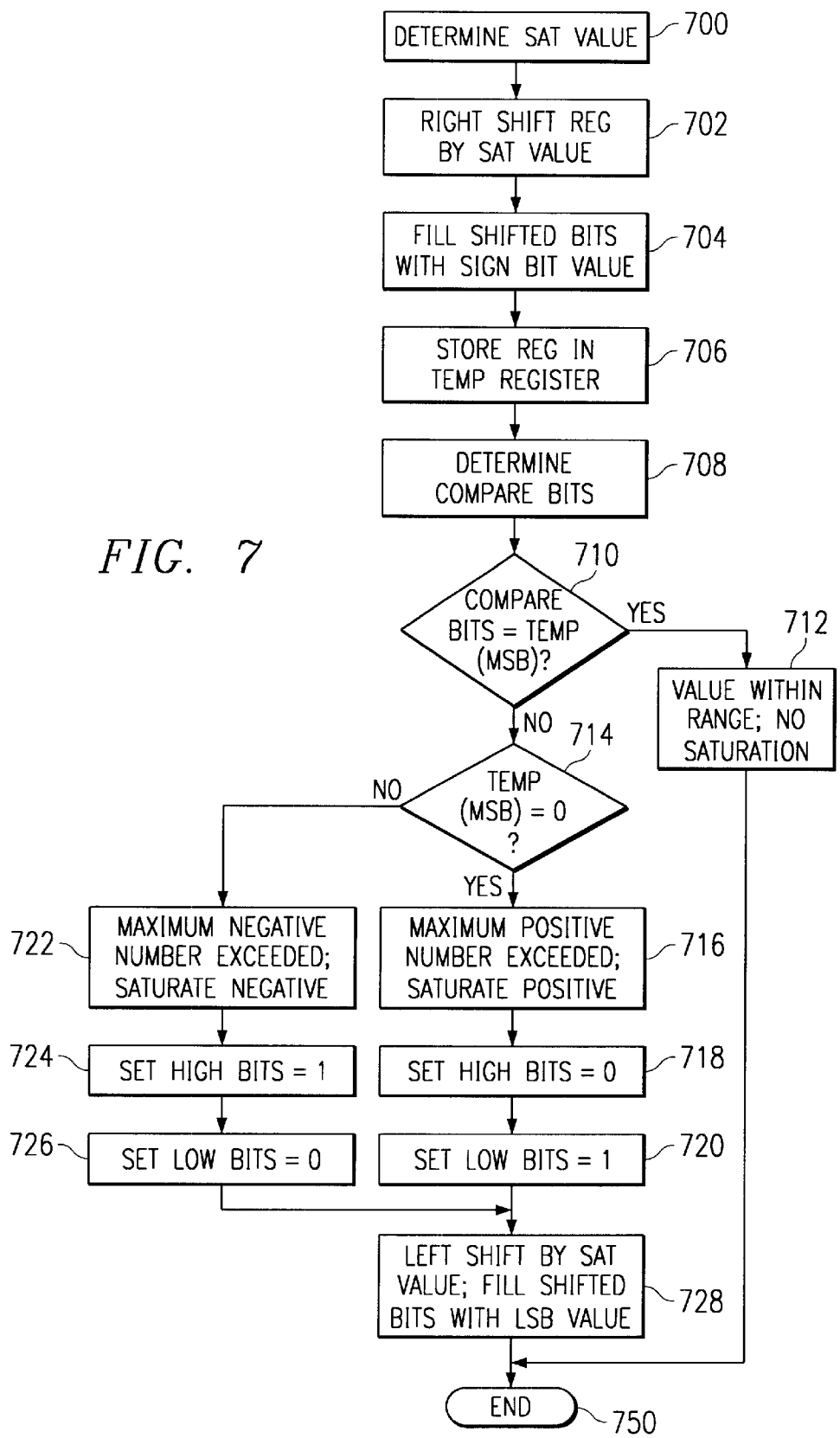
FIG. 7, illustrates a flow chart of a method for saturating contents in a register for use in accordance with one embodiment of the present invention.

Referring to FIG. 7, another method for saturating the data contents of register 100 in accordance with one embodiment of the present invention is disclosed. In Step 700, the saturation value is determined. In an embodiment, the saturation value may be the difference between range bit 106 and base bit 108 of FIG. 1. By determining the saturation value in this matter, register 100 may not be saturated below base bit 108. Thus, the common reference location is accounted for. In Step 702, register 100 is right shifted by the saturation value of Step 700. In Step 704, the shifted bits emptied by the right shift are set to the value of sign bit 110. Specifically, if sign bit 110 is 0, then the emptied bits are set to a value of 0. In the alternative, if sign bit 110 is 1, then the emptied bits are set to a value of 1. In Step 706, the shifted contents of register 100 are stored in temporary register 160.

In Step 708, compare bits 180 of temporary register 160 are determined. Referring back to FIG. 1A, compare bits 180 are the set of bits greater than, and including, base bit 174 of temporary register 160. Base bit 174 is in the same bit location as base bit 108 of register 100. Thus, during saturation operations, on register 100, register 100 and temporary register 160 have the same base bit location as a common reference point. In an embodiment, compare bits 180 of temporary register 160 are equivalent in size to high bits 150 of register 100. In Step 710, compare bits 180 are compared to sign bit 110. Alternatively, compare bits 180 may be compared to most significant bit 170, which has the same value as sign bit 110. If the value of compare bits 180 is equal to the value of sign bit 110, then Step 712 is executed. Step 712 indicates the value in register 100 is within the desired range, as indicated by range bit 106. Thus, no saturation operations are performed on register 100.

If the value of compare bits 180 is not equal to sign bit 110, then Step 714 is executed by determining whether sign bit 110 is equal to a value of 0. A value of 0 in sign bit 110 indicates that the maximum positive number allowed by the desired range in register 100 has been exceeded. A value of 1 in sign bit 110 indicates the maximum negative number allowed by the desired range of register 100 has been exceeded. In Step 716, register 100 is to be saturated with the maximum positive number allowed by the desired range. In Step 718, high bits 150 of register 100 are set to a value of 0. In Step 720, low bits 140 of register 100 are set to a value of 1. Thus, the bits from sign bit 110 to base bit 108 are set equal to 0, and the bits lower than base bit 108 are set equal to 1.

In Step 722, register 100 is to be saturated with the maximum negative number when sign bit 110 is not equal to 0. In Step 724, high bits 150 of register 100 are set equal to a value of 1. In Step 726, low bits 140 of register 100 are set equal to a value of 0. In an embodiment, the bits from base bit 108 to sign bit 110 are set to a value of 1, while the bits lower than base 108 have a value of 0.

After high bits 150 and low 140 of register 100 have been set in either step 720 or step 726, Step 728 is executed by left shifting register 100 by the saturation value of Step 700. The bits emptied by the shift in register 100 are filled with the value of least significant bit 102. Therefore, the emptied bits have the same value as low bits 140. Step 750 ends the saturation operations.

By shifting the contents of register 100 by the saturation value of Step 700, the desired range, as determined by range bit 106, is saturated to a maximum negative or positive number without compatibility problems that may result by saturating below base bit 108. Further, the disclosed method may be executed in two cycles on processor 101. Moreover, no values for specific saturation bit sizes need to be stored in memory.

Thus, it is apparent that there has been provided, in accordance with the present invention, an apparatus and method for saturating a register on a processor at any bit position that satisfies the advances set forth above. Although the present invention has been described in detail, it should be understood that various changes, substitutions, and alternations may be made herein. Other examples, may be readily ascertainable by one skilled in the art and can be made without departing from the spirit and the scope of the present invention as defined by the following claims.

What is claimed is:

1. A method for saturating data in a register, the method comprising the steps of:

shifting data contents in the register by a saturation value and setting shifted bits equal to a sign bit in the register;

storing the shifted register contents in a temporary register, the temporary register having compare bits;

setting high bits and low bits of the register to a saturate positive value when the compare bits of the temporary register are not equal to the sign bit, and the sign bit indicates a positive data word in the register;

setting the high bits and the low bits of the register to a saturate negative value when the compare bits of the temporary register are not equal to the sign bit, and the sign bit indicates a negative data word in the register; and shifting the set data contents in the register by the saturation value and setting shifted bits equal to a least significant bit on the register.

2. The method of claim 1, further comprising the step of:

ceasing saturation when the compare bits of the temporary register are equal to the sign bit.

3. The method of claim 1, wherein the register has a range bit, indicated by a first pointer, and a base bit, indicated by a second pointer, and the saturation value in the first shifting step is the difference between the range bit and the base bit.

4. The method of claim 1, wherein the sign bit is a most significant bit in the register.

5. The method of claim 1, wherein the temporary register has a base bit, and the compare bits are a set of bits greater than and including the base bit.

6. The method of claim 1, wherein the saturate positive value sets the high bits equal to 0 and sets the low bits equal to 0.

7. The method of claim 1, wherein the saturate negative value sets the high bits equal to 1 and the low bits equal to 0.

8. The method of claim 1, wherein the shifting steps are executed by a barrel shifter.

9. The method of claim 1, wherein the first shifting step is a right shift.

10. The method of claim 1, wherein the second shifting step is a left shift.

11. The method of claim 1, wherein the register is a 32-bit register.

12. The method of claim 1, wherein the sign bit indicates the positive data word with a value of 0.

13. The method of claim 1, wherein the sign bit indicates the negative data word with a value of 1.

14. A method for saturating data in a register, the method comprising the steps of:

right shifting data contents in the register by a saturation value, and setting at least one bit equal to a sign bit, wherein the sign bit is on the register;

storing the shifted data contents in a temporary register;

comparing the sign bit to the shifted contents in the temporary register;

setting the bits in the register equal to 0 when the shifted contents in the temporary register are not equal to the sign bit, and the sign bit is equal to 0, and left shifting the set data contents in the register by the saturation value, and setting shifted bits equal to 1; and setting the bits in the register equal to 1 when the shifted contents in the temporary register are not equal to the sign bit, and the sign bit is equal to 1, and left shifting the set data contents in the register by the saturation value, and setting shifted bits equal to 0.

15. The method of claim 14, further comprising:

ceasing saturation when the shifted contents are equal to the sign bit.

16. The method of claim 14, wherein the saturation value is equal to a range of bits to be saturated on the register.

17. The method of claim 14, wherein the sign bit is a most significant bit on the register.

18. An apparatus for saturating data in a register on a processor comprising:

the register having a sign bit, a least significant bit, high bits and low bits;

a shifting device, wherein the data contents in the register are shifted by a saturation value;

a temporary register having compare bits, wherein shifted contents of the register are stored;

a device for setting high bits and low bits of the register to a saturate positive value when the compare bits of the temporary register are not equal to the sign bit, and the sign bit indicates a positive data word in the register, and setting the high bits and the low bits of the register to a saturate negative value when the compare bits of the temporary register are not equal to the sign bit, and the sign bit indicates a negative data word in the register.

19. The apparatus of claim 18, wherein the saturate positive value sets the high bits equal to 0 and the low bits equal to 1.

20. The apparatus of claim 18, wherein the saturate negative value sets the high bits equal to 1 and the low bits equal to 0.

21. The apparatus of claim 18, wherein the sign bit is a most significant bit on the register.

\* \* \* \* \*